(12) United States Patent
Yandle, II

(10) Patent No.: US 7,699,579 B2
(45) Date of Patent: Apr. 20, 2010

(54) MECHANICAL PUMP SEAL

(76) Inventor: S. Elwood Yandle, II, 5883 Rhodes Ave., New Orleans, LA (US) 70131

( * ) Notice: Subject to any disclaimer, the term of this patent is extended or adjusted under 35 U.S.C. 154(b) by 988 days.

(21) Appl. No.: 11/356,684

(22) Filed: Feb. 17, 2006

(65) Prior Publication Data

US 2007/0224036 A1    Sep. 27, 2007

Related U.S. Application Data

(60) Provisional application No. 60/654,217, filed on Feb. 18, 2005.

(51) Int. Cl.
*F04D 29/04* (2006.01)
(52) U.S. Cl. .......................... 415/1; 415/231
(58) Field of Classification Search .......... 415/230, 415/231; 416/174; 277/371, 377, 379, 390, 277/404, 405
See application file for complete search history.

(56) References Cited

U.S. PATENT DOCUMENTS

| | | | | |
|---|---|---|---|---|
| 2,320,708 A * | 6/1943 | Yost | ...... | 417/423.11 |
| 2,375,085 A * | 5/1945 | Curtis | ...... | 415/168.2 |
| 2,455,700 A * | 12/1948 | Porges | ...... | 277/379 |
| 2,823,058 A * | 2/1958 | Ecker et al. | ...... | 277/589 |
| 4,099,729 A * | 7/1978 | Nylykke | ...... | 277/400 |
| 4,511,149 A | 4/1985 | Weise | | |
| 4,648,605 A | 3/1987 | Marsi | | |
| 4,684,330 A * | 8/1987 | Andersson et al. | ...... | 417/360 |
| 6,053,500 A * | 4/2000 | Fondelius | ...... | 277/408 |
| 6,457,950 B1 | 10/2002 | Cooper et al. | | |
| 6,461,115 B1 * | 10/2002 | Ferrier et al. | ...... | 417/53 |
| 6,467,395 B2 | 10/2002 | Graham | | |
| 7,204,490 B2 * | 4/2007 | Huang | ...... | 277/372 |
| 2002/0036383 A1 * | 3/2002 | Bjornson | ...... | 277/371 |
| 2002/0074732 A1 * | 6/2002 | Burroughs | ...... | 277/390 |
| 2005/0023042 A1 * | 2/2005 | Yong et al. | ...... | 175/372 |
| 2006/0024174 A1 * | 2/2006 | Welch | ...... | 417/360 |

FOREIGN PATENT DOCUMENTS

TW    93215157 U  *  9/2004

* cited by examiner

*Primary Examiner*—Ninh H Nguyen
*Assistant Examiner*—Aaron R Eastman
(74) *Attorney, Agent, or Firm*—Garvey, Smith, Nehrbass & North, L.L.C.; Seth M. Nehrbass; Charles C. Garvey, Jr.

(57) ABSTRACT

An improved mechanical seal and repair method can be used with mechanical pump seal assemblies. The improved seal utilizes rotating and non-rotating sections of improved configuration, each of which can form a seal using a standard size carbon-face O-ring. The mechanical seal can be in the form of replacement parts that replace the old parts without modifications to the overall seal and assembly.

43 Claims, 5 Drawing Sheets

MECHANICAL PUMP SEAL

CROSS-REFERENCE TO RELATED APPLICATIONS

Priority of my U.S. Provisional Patent Application Ser. No. 60/654,217, filed 18 Feb. 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to mechanical seal assemblies for pumps. More particularly, the present invention relates to an improved mechanical pump seal assembly that includes a specially configured seal cartridge enabling standard O-rings to be used instead of specially configured Teflon® seals and that can be used as a retrofit for existing mechanical seal assemblies associated with pumps such as barge pumps.

2. General Background of the Invention

An example of a mechanical seal assembly is shown in the U.S. Pat. No. 4,648,605 issued to Joseph Marsi and entitled "Mechanical Seal Assembly". The '605 patent discloses a mechanical seal assembly especially adaptable for use in the chemical industry in which a jacket that is impervious to the chemical involved surrounds a spring which urges seal faces toward one another, the spring being capable of transmitting torque and providing axial support to the jacket.

At the Flowserve website (www.flowserve.com), a number of pump sealing arrangements are displayed. The home page for seals is www.flowserve.com/Seals/seals.htm. One of the seals disclosed at the website is called a "UC" seal. The UC seal is designed for corrosive/non-corrosive high pressure services with a specific gravity of 0.45 or higher. The canned "UC" seal design incorporates a high pressure design feature that is similar to the Flowserve "U" seal while incorporating an encapsulated graphite gasketed silicon carbide rotating face. The UC seal's canned face design provides for low level emissions control.

Borg Warner sells mechanical seals for pumps such as barge pumps under its product designations U2250 and U1875. These seal designs utilize a cylindrically shaped sleeve that fits in between the pump shaft and a seal cartridge that employs a U-shaped cup seal. Over time, the sleeve can be fret damaged by the cup seal.

Fret damage occurs as a result of the original factory Teflon® U-cup moving up and down on the shaft sleeve. The U-cup (when in operation) is inflated by the product being pumped under pressure, thus putting pressure on the shaft sleeve. The Teflon® U-cup under such pressure will scratch the sleeve. These resulting scratches can be described as fret damage. This fret damage can cause leaking of gases to occur through the Teflon® U-cup. In addition, once the pressure is relieved, the U-cup deflates, which can allow leakage of gases through the U-cup, even if it is not fret-damaged.

BRIEF SUMMARY OF THE INVENTION

The present invention provides an improved seal arrangement for sealing a sleeve having a UC type seal such as those offered by Flowserve® or Borg Warner® model U2250 or U 1875 mechanical seals.

The present invention provides advantages over prior art seal arrangements. The present invention enables the reuse of fret damaged seal sleeves. The seal sleeve can be reused because the new rotating face uses a different area on the shaft seal sleeve to accomplish a seal.

The present invention enables the use of standard size readably available O-rings. The present invention enables the use of standard rubber or synthetic rubber O-rings throughout the seal assembly, such as O-rings made of Kalrez® brand material or generic equivalents thereof. The present invention does not require modifications to the seal sleeve or cartridge. The seal sleeve is a component part of the whole cartridge seal assembly. The present invention provides a pump seal repair kit that can be field installed.

The present invention includes a barge pump apparatus, comprising:

a) a pump housing that is configured to be mounted to a barge deck and the extend vertically below deck, the pump housing having a pump head;

b) a pump shaft extending vertically in the housing;

c) a driver that rotates the pump shaft; and d) a mechanical seal that prevents leakage of the barge cargo from a tank of the barge to the surrounding atmosphere, the seal including:

a seal flange that attaches to the pump head, the seal flange having a central flange opening receptive of the pump shaft and an annular socket surrounding the central flange opening;

a sleeve that closely fits the pump shaft, being attached to the pump shaft and rotating therewith;

an annular non-rotating seal element that seats upon the seal flange socket, the non-rotating seal element providing a carbon containing sealing face;

an annular rotating seal element that is in face-to-face contact with the carbon containing sealing face, said rotating seal element having an open center and being mounted upon the sleeve at the open center;

a spring assembly that biases the seal elements together, the spring assembly having an open center that receives the sleeve and shaft, one end of the spring assembly bearing against the sleeve, the other end of the spring assembly bearing against the rotating seal element;

a plurality of O-rings that are carried by the seal members, one O-ring attached to the non-rotating seal element and another O-ring attached to the rotating seal element. Preferably, the rotating seal member is of a metallic material. Preferably, the non-rotating seal member is of a non-metallic material. Preferably, the spring assembly and rotating seal member are interconnected.

Preferably, the O-rings are circular in transverse cross section; preferably, the O-rings are of uniform transverse cross section; preferably, one or more of the O-rings are of a Kalrez® brand material or generic equivalents thereof (perfluoroelastomer material).

Preferably, the sleeve has an annular shoulder and the spring assembly bears against the annular shoulder of the sleeve. Preferably, the sleeve has multiple sections of varying outer diameter. Preferably, one of the O-rings contacts the pump shaft. Preferably, one of the O-rings contacts the seal flange.

The present invention also includes a barge pump seal apparatus for sealing leakage around the pump shaft of a barge pump having a pump housing that is configured to be mounted to a barge deck and the extend vertically below deck, the pump housing having a pump head and a driver that rotates the pump shaft, said seal apparatus comprising:

a) a seal flange that attaches to the pump head, the seal flange having a central flange opening receptive of the pump shaft and an annular socket surrounding the central flange opening;

b) a sleeve that closely fits the pump shaft, being attached to the pump shaft and rotating therewith;

c) an annular non-rotating seal element that seats upon the seal flange socket, the non-rotating seal element providing a carbon containing sealing face;

d) an annular rotating seal element that is in face-to-face contact with the carbon containing sealing face, said rotating seal element having an open center and being mounted upon the sleeve at the open center;

e) a spring assembly that biases the seal elements together, the spring assembly having an open center that receives the sleeve and shaft, one end of the spring assembly bearing against the sleeve, the other end of the spring assembly bearing against the rotating seal element; and f) a plurality of O-rings that are carried by the seal members, one O-ring attached to the non-rotating seal element and another O-ring attached to the rotating seal element. Preferably, the rotating seal member is of a metallic material. Preferably, the non-rotating seal member is of a non-metallic material. Preferably, the spring assembly and rotating seal member are interconnected.

Preferably, the O-rings are circular in transverse cross section; preferably, the O-rings are of uniform transverse cross section; preferably, one or more of the O-rings are of a Kalrez® brand material or generic equivalents thereof.

Preferably, the sleeve has an annular shoulder and the spring assembly bears against the annular shoulder of the sleeve. Preferably, the sleeve has multiple sections of varying outer diameter.

The present invention also includes a pump seal apparatus for sealing leakage around the pump shaft of a pump having a pump housing and a driver that rotates the pump shaft relative to the housing, said seal apparatus comprising:

a) a seal flange that attaches to the pump housing, the seal flange having a central flange opening receptive of the pump shaft and an annular socket surrounding the central flange opening;

b) a sleeve that closely fits the pump shaft and being attached to the pump shaft and rotating therewith;

c) an annular non-rotating seal element that seats upon the seal flange socket and connects to the seal flange, the non-rotating seal element providing a carbon containing sealing face;

d) an annular rotating seal element that is in face-to-face sealing contact with the carbon-containing sealing face, said rotating seal element having an open center and being mounted upon the sleeve at the open center, the contact defining a gas seal that prevents leakage of gas molecules, the sealing face and the rotating seal element each having a flatness of not more than two light bands (but preferably not more than one light band);

e) a spring assembly that biases the seal elements together, the spring assembly having an open center that receives the sleeve and shaft, one end of the spring assembly bearing against the sleeve, the other end of the spring assembly bearing against the rotating seal element; and f) a plurality of O-rings that are carried by the seal members, one O-ring attached to the non-rotating seal element and another O-ring attached to the rotating seal element. Preferably, non-rotating seal element is of a seal-grade silicon carbide. Preferably, the non-rotating seal element is of a seal-grade carbon material. Preferably, the non-rotating seal member is of a non-metallic material. Preferably, the rotating seal element is of a stainless steel material. Preferably, there is a spring that urges the seal elements together. Preferably, one or more of the O-rings are of a Kalrez® brand material or generic equivalents thereof. Preferably, the sleeve has an annular shoulder that transfers load between the sleeve and the spring. Preferably, the spring rotates with the sleeve.

The present invention also includes a mechanical pump seal assembly for sealing a rotatable pump shaft, a sleeve that is fitted to the shaft for rotation therewith, and a stationary housing containing a chemically active fluid, comprising:

a) a stationary seal ring section connected to said sleeve;

b) a rotatable ring section connected to said sleeve;

c) seal faces on said seal rings opposed to one another;

d) wherein each ring section has an annular groove;

e) an O-ring that occupies each annular groove;

f) wherein one of the O-rings engages the sleeve and the other O-ring engages the stationary housing. Preferably, the stationary seal ring is of metallic material. Preferably, the rotatable ring section is of a silicon carbide material. Preferably, the rotatable ring section is of a carbon material. Preferably, the O-ring is a carbon-face O-ring. Preferably, n the stationary ring section is of a stainless steel material. Preferably, the silicon carbide is a seal-grade silicon carbide. Preferably, the carbon material is a seal-grade carbon.

The present invention also includes a method of sealing a rotatable shaft mechanical seal with a assembly, wherein the seal assembly includes a sleeve that is fitted to the shaft and a stationary housing containing a chemically active fluid, comprising:

a) providing a stationary seal ring section connected to said sleeve;

b) providing a rotatable ring section connected to said sleeve;

c) providing seal faces on said seal rings opposed to one another;

d) wherein in step "c" each ring section has an annular groove;

e) placing an O-ring in each annular groove;

f) wherein one of the O-rings engages the sleeve and the other O-ring engages the stationary housing. Preferably, the stationary seal ring is of metallic metal. Preferably, the rotatable ring section is of a silicon carbide material. Preferably, the rotatable ring section is of a carbon material. Preferably, the O-ring is a carbon-face 0-ring. Preferably, the stationary ring section is of a stainless steel material. Preferably, the silicon carbide is a seal-grade silicon carbide. Preferably, the carbon material is a seal-grade carbon.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figures 1, 2:
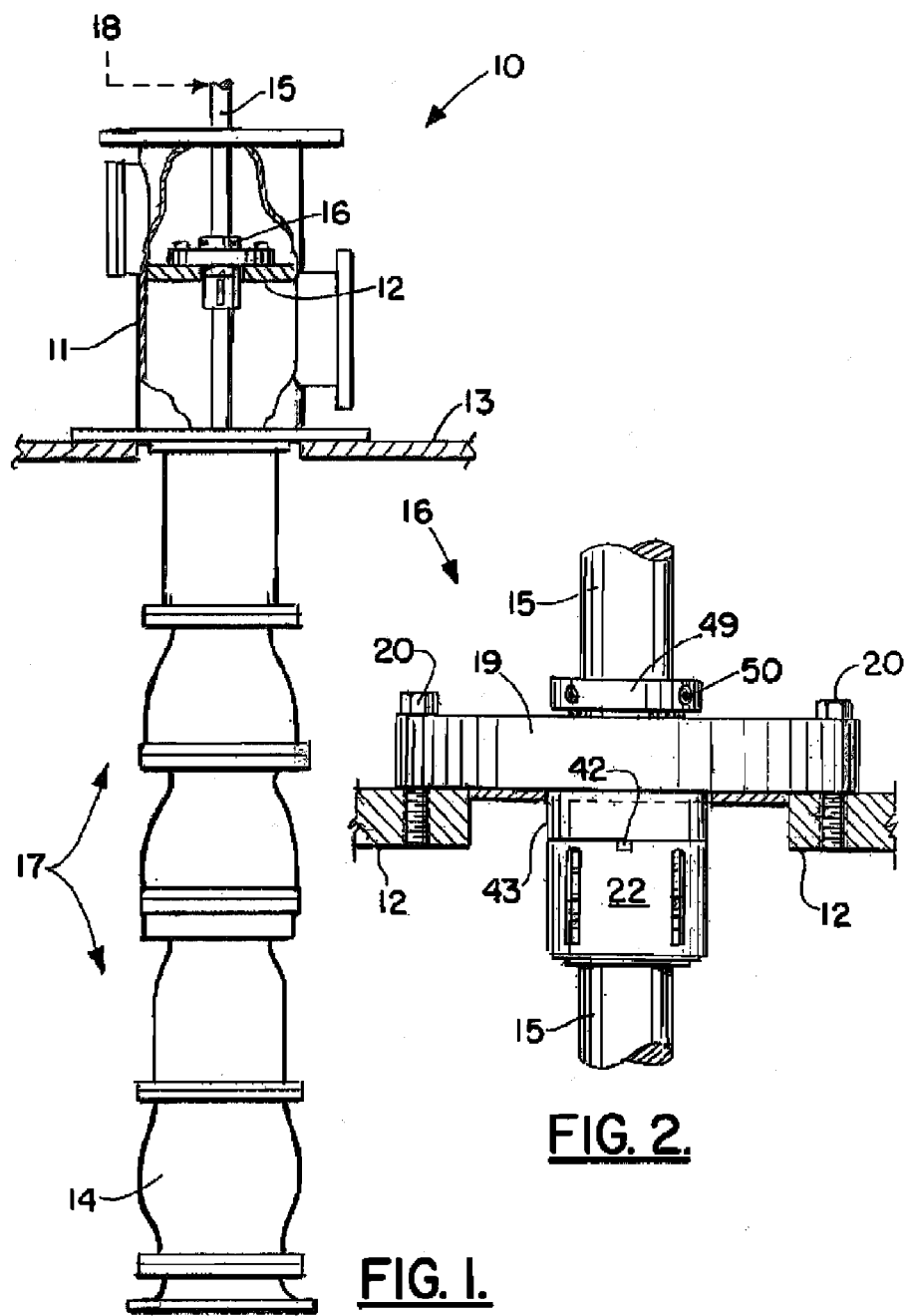
FIG. 1 is an elevation view of the preferred embodiment of the apparatus of the present invention.
FIG. 2 is a partial sectional, elevation view of the preferred embodiment of the apparatus of the present invention.

FIG. 1 shows the preferred embodiment of the apparatus of the present invention, designated generally by the numeral 10. Pump apparatus 10 provides a pump housing 11 that includes a pump head 12. The pump apparatus 10 can be for example be a barge pump, such barge pumps being commercially available (see www.Flowserve.com). Such barge pumps have been sold for years under the trademark Byron Jackson®.

In FIG. 1, pump housing 11 is shown being attached to barge deck 13. Lower end portion 14 of pump housing 11 extends below deck into a compartment 17 that contains a fluid to be pumped.

The present invention also discloses an improved mechanical pump seal 16 for sealing rotary pump shaft 15 as it extends downwardly in pump housing 11. The overall configuration of pump housing 11 and shaft 15 as well as any selective shaft driver 18 (e.g. diesel engine and transmission) is known in the art. While the cargo is contained in the below deck compartment 17 that is positioned below deck 13, the mechanical seal 16 would typically be positioned above deck 13 as shown in FIG. 1.

Figure 3:
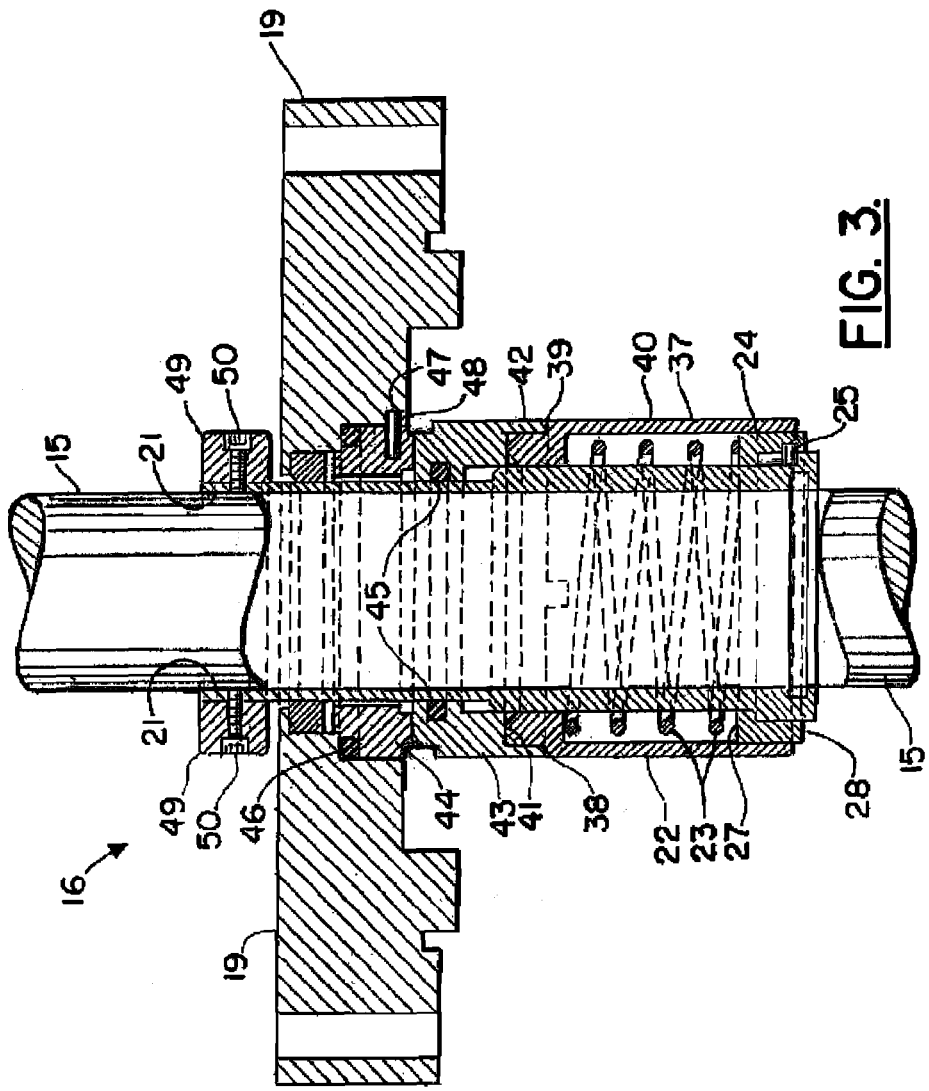
FIG. 3 is a sectional view of the preferred embodiment of the apparatus of the present invention illustrating the mechanical seal.
Figure 4:
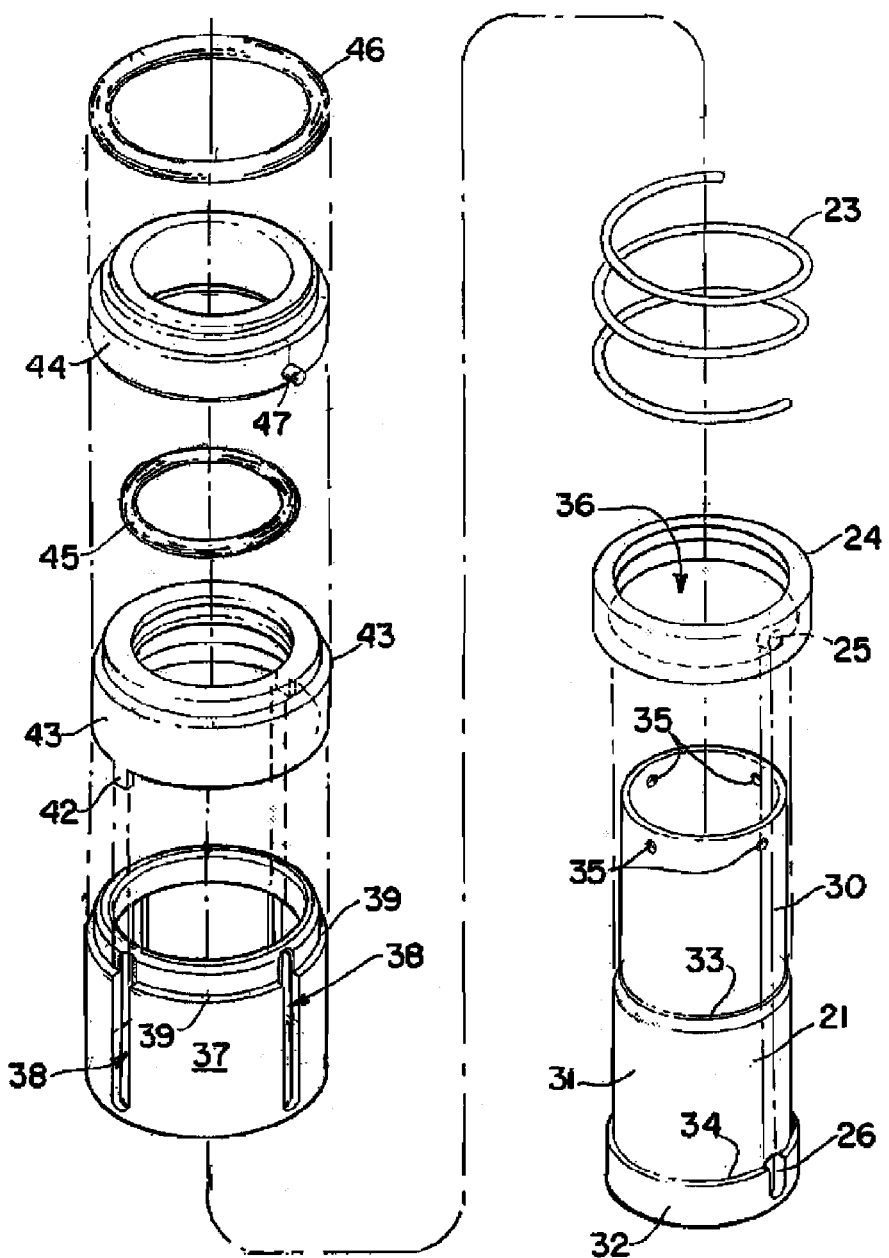
FIG. 4 is a partial perspective exploded view of an alternative embodiment of the apparatus of the present invention.
Figure 5:
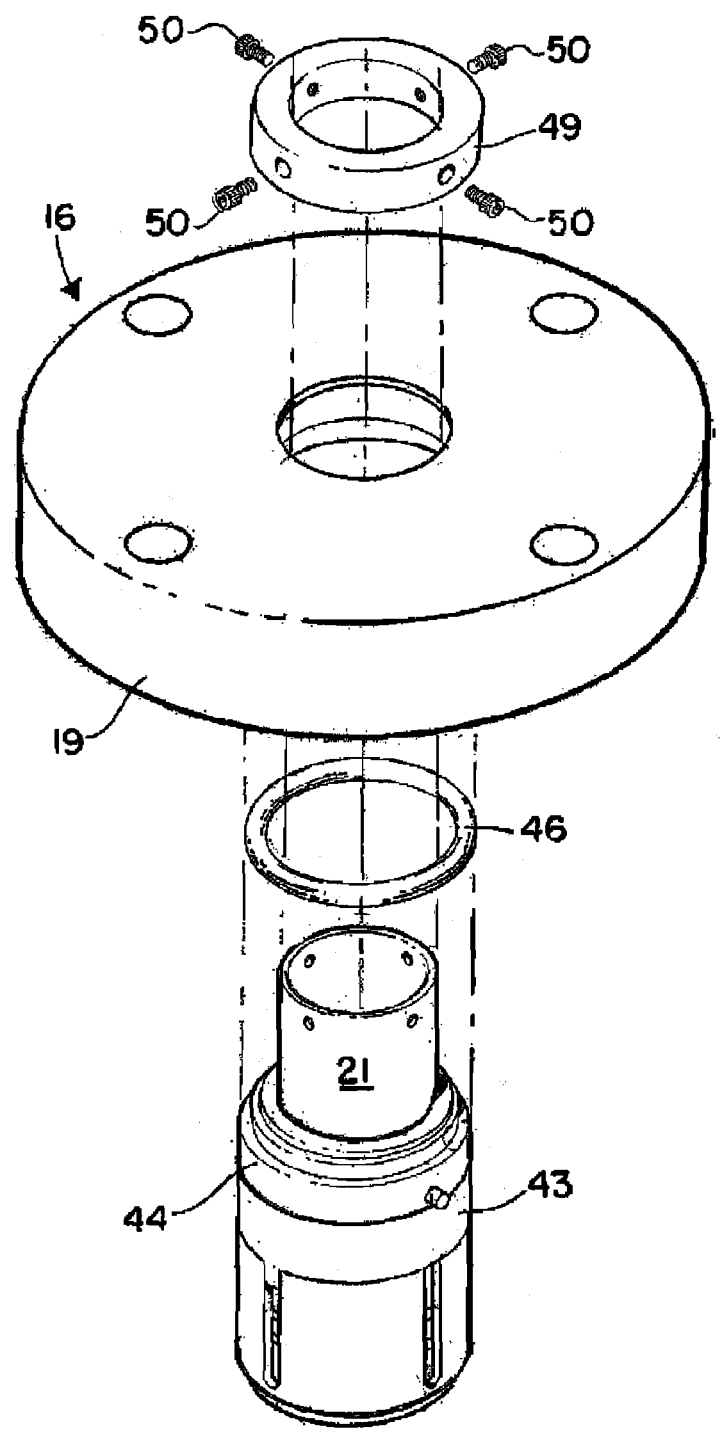
FIG. 5 is a partial perspective view of the preferred embodiment of the apparatus of the present invention.

Mechanical seal 16 is shown more particularly in FIGS. 2-6. The mechanical seal 16 includes the number of different parts that are interconnected as shown in FIGS. 2, 3, 4 and 6. Mechanical seal 16 includes seal flange 19 which is a non-rotating part. Non-rotating seal element 44 nests in seal flange 19 as shown in FIG. 3 and is thus a non-rotating part. Rotating seal element 43 is urged into face-to-face sealing engagement with non-rotating seal element 44 by spring cage assembly 22. Compression of the coil spring 23 of cage assembly 22 is realized by providing a larger diameter section 32 on sleeve 21 which is attached to and rotates with pump shaft 15. In addition, a drive collar 49 is attached to pump shaft 15 opposite spring cage assembly 22 and rotates with pump shaft 15. This arrangement can be seen in FIGS. 2, 4, 5 and 6.

Seal flange 19 is attached to pump head 12 with bolted connections 20. The pump head 12 can be drilled and tapped for bolts that secure the seal flange 19 to the pump head 12. The seal flange 19 can be provided with a register that centers it appropriately on the pump head 12.

The spring cage assembly 22 carries a coil spring 23 in between parts 37 and 24. The part 24 is a ring that has one or more lugs 25 that are circumferentially spaced such as for example 90 degrees apart or 180 degrees apart. These lugs 25 fit into slots 26 on the larger diameter section 32 of sleeve 21. Ring 24 has a larger diameter section 27 and a smaller diameter section 28 as shown in FIG. 3. An annular shoulder 29 is provided at the interface between the larger and smaller diameter sections 27, 28 as shown in FIG. 3. This annular shoulder 29 rests upon an annular shoulder 34 of sleeve 21 that is in between the larger diameter section 32 and an intermediate diameter section 31. Another annular shoulder 31 is provided on sleeve 21 in between the intermediate diameter section 31 and the smaller diameter section 30.

A plurality of openings 35 are provided in the smaller diameter section 30 of sleeve 21. These openings 35 are preferably circumferentially spaced such as for example about 90 degrees apart. Each opening 35 is receptive of a bolt 50 of driver 49.

Ring 24 provides an open center 36 so that it fits over the smaller and intermediate sections 30, 31 of sleeve 21, enabling the annular shoulder 29 of the ring 24 to sit upon the annular shoulder 34 of sleeve 32 as shown in FIG. 3.

The spring cage assembly 22 includes cage 37, coil spring 23, and ring 24. The coil spring 23 fits over the intermediate diameter section 31 of sleeve 21 and is contained within cage 37 (see FIG. 3). Cage 37 provides a plurality of longitudinal slots 38. Cage 37 also provides an annular shoulder 39. Rotating seal element 33 interlocks with cage 37, the lugs 42 on rotating seal element 43 registering in the slots 38 of cage 37 as shown in FIG. 3. The cage 37 thus provides a larger diameter section 40 that contains coil spring 23 and a smaller diameter section 41 that connects with rotating seal element 43. This interconnection can be seen in FIG. 3.

Figure 6:
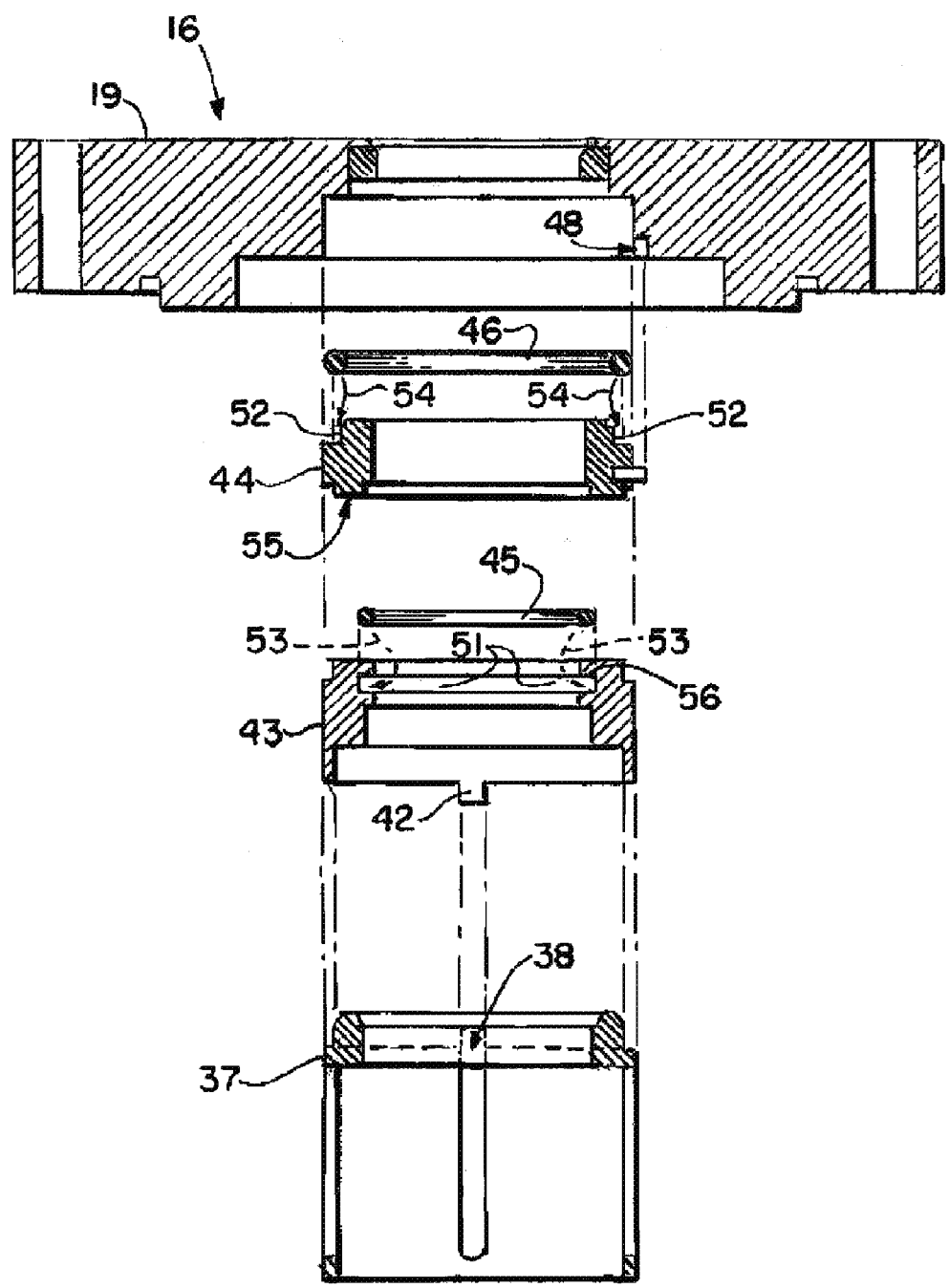
FIG. 6 is an exploded, sectional elevational view of the preferred embodiment of the apparatus of the present invention.

A pair of O-rings 45, 46 are provided, one being carried by the rotating seal element 43 and another being carried by the non-rotating seal element 44. The rotating seal element 43 has an annular recess 51 or groove that is receptive of O-ring 45 as shown in FIGS. 3 and 6. The O-ring 46 fits an annular recess 52 on non-rotating seal element 44 as shown in FIGS. 3 and 6. Locking pin 47 on non-rotating seal element 44 nests in a recess 48 of seal flange 19 as shown in FIGS. 3 and 6.

In order to assemble the various components of mechanical seal 16, the sleeve 21 is first fitted with spring cage assembly 22 by placing it over the sleeve 21, lowering it until ring 24 rests upon larger diameter section 32 and lugs 25 engage slots 26. The rotating seal element 43 is then placed over the upper end portion of sleeve 21 and lowered until it registers upon spring cage assembly 22 wherein lugs 42 interlock with longitudinal slots 38. Before placing the rotating seal element in position, it is fitted with O-ring 45 as indicated schematically by arrows 53 in FIG. 6. The non-rotating seal element 44 is also fitted with O-ring 46 as indicated by arrows 54 in FIG. 6. The non-rotating seal element is then placed over the sleeve 21 until sealing face 55 rests upon sealing face 56 of rotating seal element 43. The non-rotating seal element 44 is preferably of a carbide material. The rotating seal element 43 can be of stainless steel, silicon carbide, tungsten carbide, ceramic, bronze, or other material as may be appropriate for the type of material being pumped, so that the faces 55, 56 form a seal that when placed under compression are urged together by spring 23. This allows sealing even of gases of very small molecular diameter (unlike in the prior art where the Teflon® U-seals, once deflated, will allow gases to leak). The O-ring 45 forms a seal with the outer surface of sleeve 21 as indicated in FIG. 3. The O-ring 46 forms a seal with seal flange 19 as indicated in FIG. 3. The load is transferred from pump shaft 15 to sleeve 21 using drive ring 49 and bolts 50 that extend through the drive ring 49 and through openings 35 of sleeve 21, then connecting to pump shaft 15.

The following is a list of parts and materials suitable for use in the present invention.

PARTS LIST

| Part Number | Description |
| --- | --- |
| 10 | pump apparatus |
| 11 | pump housing |

-continued

PARTS LIST

| Part Number | Description |
|---|---|
| 12 | pump head |
| 13 | barge deck |
| 14 | lower end portion |
| 15 | pump shaft |
| 16 | mechanical seal |
| 17 | below deck compartment |
| 18 | driver |
| 19 | seal flange |
| 20 | bolted connection |
| 21 | sleeve |
| 22 | spring cage assembly |
| 23 | coil spring |
| 24 | ring |
| 25 | lug |
| 26 | slot |
| 27 | larger diameter section |
| 28 | smaller diameter section |
| 29 | annular shoulder |
| 30 | smaller diameter section |
| 31 | intermediate diameter section |
| 32 | larger diameter section |
| 33 | annular shoulder |
| 34 | annular shoulder |
| 35 | opening |
| 36 | open center |
| 37 | cage |
| 38 | longitudinal slot |
| 39 | annular shoulder |
| 40 | larger diameter section |
| 41 | smaller diameter section |
| 42 | lug |
| 43 | rotating seal element |
| 44 | non-rotating seal element |
| 45 | O-ring |
| 46 | O-ring |
| 47 | locking pin |
| 48 | recess |
| 49 | drive collar |
| 50 | bolt |
| 51 | recess |
| 52 | recess |
| 53 | arrow |
| 54 | arrow |
| 55 | sealing face |
| 56 | sealing face |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A barge pump apparatus, comprising:
    a) a pump housing that is configured to be mounted to a barge deck and extend vertically below deck, the pump housing having a pump head;
    b) a pump shaft extending vertically in the housing;
    c) a driver that rotates the pump shaft; and
    d) a mechanical seal that prevents leakage of the barge cargo from a tank of the barge to the surrounding atmosphere, the seal including:
        a seal flange that attaches to the pump head, the seal flange having a central flange opening receptive of the pump shaft and an annular socket surrounding the central flange opening;
        a sleeve that closely fits the pump shaft, being attached to the pump shaft and rotating therewith, said sleeve having an upper smaller diameter section and a lower, larger diameter section;
        an annular non-rotating seal element that seats upon the seal flange socket, the non-rotating seal element providing a carbon containing sealing face;
        an annular rotating seal element that is in face-to-face contact with the carbon containing sealing face, said rotating seal element having an open center and being mounted upon the sleeve at the open center;
        a spring assembly that biases the seal elements together, the spring assembly having an open center that receives the sleeve and shaft, one end of the spring assembly bearing against the sleeve, the other end of the spring assembly bearing against the rotating seal element;
        a plurality of O-rings that are carried by the seal members, one O-ring attached to the non-rotating seal element and another O-ring attached to the rotating seal element and sealing against the smaller diameter section of the sleeve.

2. The barge pump apparatus of claim 1 wherein the rotating seal member is of a metallic material.

3. The barge pump apparatus of claim 1 wherein the non-rotating seal member is of a non-metallic material.

4. The barge pump apparatus of claim 1 wherein the spring assembly and rotating seal member are interconnected.

5. The barge pump apparatus of claim 1 wherein the O-rings are circular in transverse cross section.

6. The barge pump apparatus of claim 5 wherein the O-rings are of uniform transverse cross section.

7. The barge pump apparatus of claim 5 wherein one or more of the O-rings are of a perfluoroelastomer material.

8. The barge pump apparatus of claim 1 wherein the sleeve has an annular shoulder and the spring assembly bears against the annular shoulder of the sleeve.

9. The barge pump apparatus of claim 1 wherein one of the O-rings contacts the seal flange.

10. A barge pump seal apparatus for sealing leakage around the pump shaft of a barge pump having a pump housing that is configured to be mounted to a barge deck and extend vertically below deck, the pump housing having a pump head and a driver that rotates the pump shaft, said seal apparatus comprising:
    a) a seal flange that attaches to the pump head, the seal flange having a central flange opening receptive of the pump shaft and an annular socket surrounding the central flange opening;
    b) a sleeve that closely fits the pump shaft, being attached to the pump shaft and rotating therewith, said sleeve having an upper smaller diameter section and a lower larger diameter section;
    c) an annular non-rotating seal element that seats upon the seal flange socket, the non-rotating seal element providing a carbon containing sealing face;
    d) an annular rotating seal element that is in face-to-face contact with the carbon containing sealing face, said rotating seal element having a cylindrically shaped inner wall surrounding an open center and being mounted upon the sleeve at the open center;
    e) an annular groove in the annular rotating seal element at the cylindrically shaped inner wall, wherein portions of the cylindrically shaped inner wall extend above and below the annular groove;
    f) a spring assembly that biases the seal elements together, the spring assembly having an open center that receives the sleeve and shaft, one end of the spring assembly bearing against the sleeve, the other end of the spring assembly bearing against the rotating seal element; and g) a plurality of O-rings that are carried by the seal members, one O-ring attached to the non-rotating seal element and another O-ring attached to the rotating seal element, occupying said annular groove, and sealing against the smaller diameter section of the sleeve.

11. The pump seal apparatus of claim 10 wherein the rotating seal member is of a metallic material.

12. The pump seal apparatus of claim 10 wherein the non-rotating seal member is of a non-metallic material.

13. The pump seal apparatus of claim 10 wherein the spring assembly and rotating seal member are interconnected.

14. The pump seal apparatus of claim 10 wherein the O-rings are circular in transverse cross section.

15. The pump seal apparatus of claim 14 wherein the O-rings are of uniform transverse cross section.

16. The pump seal apparatus of claim 10 wherein one or more of the O-rings are of a perfluoroelastomer material.

17. The pump seal apparatus of claim 10 wherein the sleeve has an annular shoulder and the spring assembly bears against the annular shoulder of the sleeve.

18. A pump seal apparatus for sealing leakage around the pump shaft of a pump having a pump housing and a driver that rotates the pump shaft relative to the housing, said seal apparatus comprising:
a) a seal flange that attaches to the pump housing, the seal flange having a central flange opening receptive of the pump shaft and an annular socket surrounding the central flange opening;
b) a sleeve that closely fits the pump shaft and being attached to the pump shaft and rotating therewith, said sleeve having an upper smaller diameter section and a lower, larger diameter section;
c) an annular non-rotating seal element that seats upon the seal flange socket and connects to the seal flange, the non-rotating seal element providing a carbon containing sealing face;
d) an annular rotating seal element that is in face-to-face sealing contact with the carbon containing sealing face, said rotating seal element having a cylindrically shaped inner wall surrounding an open center and being mounted upon the sleeve at the open center, the contact defining a gas seal that prevents leakage of gas molecules, the sealing face and the rotating seal element each having a flatness of not more than two light bands;
e) a spring assembly that biases the seal elements together, the spring assembly having an open center that receives the sleeve and shaft, one end of the spring assembly bearing against the sleeve, the other end of the spring assembly bearing against the rotating seal element;
f) an annular groove in the annular rotating seal element at the cylindrically shaped inner wall, wherein portions of the cylindrically shaped inner wall extend above and below the annular groove;
g) a plurality of O-rings that are carried by the seal members, one O-ring attached to the non-rotating seal element and another O-ring attached to the rotating seal element, occupying the annular groove, and sealing against the smaller diameter section of the sleeve.

19. The pump seal apparatus of claim 18 wherein the non-rotating seal element is of a seal-grade silicon carbide.

20. The pump seal apparatus of claim 18 wherein the non-rotating seal element is of a seal-grade carbon material.

21. The barge pump apparatus of claim 18 wherein the non-rotating seal member is of a non-metallic material.

22. The barge pump apparatus of claim 21 wherein the rotating seal element is of a stainless steel material.

23. The barge pump apparatus of claim 18 further comprising a spring that urges the seal elements together.

24. The pump seal apparatus of claim 23 wherein the sleeve has an annular shoulder that transfers load between the sleeve and the spring.

25. The pump seal apparatus of claim 24 wherein the spring rotates with the sleeve.

26. The pump seal apparatus of claim 18 wherein one or more of the O-rings are of a perfluoroelastomer material.

27. The pump seal apparatus of claim 18 wherein the sealing face and the rotating seal element each having a flatness of not more than one light band.

28. A mechanical pump seal assembly for sealing a rotatable pump shaft, a sleeve that is fitted to the shaft for rotation therewith, the sleeve having a smaller diameter section and a larger diameter section, and a stationary housing containing a chemically active fluid, comprising:
a) a stationary seal ring section connected to said housing
b) a rotatable seal ring section connected to said sleeve;
c) seal faces on said seal rings opposed to one another, the rotatable seal ring having a pair of cylindrically shaped seal faces and a first annular groove in between the cylindrically shaped seal faces;
d) wherein the stationary seal ring section has a second art annular groove;
e) an O-ring that occupies each annular groove;
f) wherein one of the O-rings engages the smaller diameter section of the sleeve in between the cylindrically shaped seal faces and the other O-ring engages the stationary housing.

29. The seal assembly of claim 28 wherein the stationary seal ring is of metallic material.

30. The seal assembly of claim 29 wherein the stationary ring section is of a stainless steel material.

31. The seal assembly of claim 28 wherein the rotatable ring section is of a silicon carbide material.

32. The seal assembly of claim 31 wherein the silicon carbide is a seal-grade silicon carbide.

33. The seal assembly of claim 28 wherein the rotatable ring section is of a carbon material.

34. The seal assembly of claim 28 wherein at least one of the O-rings is a carbon-face O-ring.

35. The seal assembly of claim 33 wherein the carbon material is a seal-grade carbon.

36. A method of sealing a rotatable shaft mechanical seal with an assembly, wherein the seal assembly includes a sleeve that is fitted to the shaft, the sleeve having a smaller diameter section and a larger diameter section, and a stationary housing containing a chemically active fluid, comprising:
a) providing a stationary seal ring section connected to said sleeve;
b) providing a rotatable ring section connected to said sleeve;
c) providing seal faces on said seal rings opposed to one another;
d) wherein in step "c" each ring section has an annular groove;
e) placing an O-ring in each annular groove;
f) wherein one of the O-rings engages the smaller diameter section of the sleeve and the other O-ring engages the stationary housing.

37. The method of claim 36 wherein the stationary seal ring is of metallic material.

38. The method of claim 37 wherein the stationary ring section is of a stainless steel material.

39. The method of claim 36 wherein the rotatable ring section is of a silicon carbide material.

40. The method of claim 39 wherein the silicon carbide is a seal-grade silicon carbide.

41. The method of claim 36 wherein the rotatable ring section is of a carbon material.

42. The method of claim 41 wherein the carbon material is a seal-grade carbon.

43. The method of claim 36 wherein at least one of the O-rings is a carbon-face 0-ring.

* * * * *